United States Patent
Jung et al.

(10) Patent No.: US 10,327,066 B2
(45) Date of Patent: Jun. 18, 2019

(54) DIRECTIONAL SPEAKER AND DISPLAY APPARATUS HAVING THE SAME

(71) Applicant: SAMSUNG ELECTRONICS CO., LTD., Suwon-si (KR)

(72) Inventors: Dong Hyun Jung, Seoul (KR); Sang Chul Ko, Seongnam-si (KR); Young Sang Lee, Siheung-si (KR); Jong Bae Kim, Seoul (KR); Hyun Joo Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/827,627

(22) Filed: Nov. 30, 2017

(65) Prior Publication Data

US 2018/0167724 A1   Jun. 14, 2018

(30) Foreign Application Priority Data

Dec. 9, 2016 (KR) ........................ 10-2016-0167539

(51) Int. Cl.
| | |
|---|---|
| H04R 5/02 | (2006.01) |
| H04R 1/32 | (2006.01) |
| H04R 1/34 | (2006.01) |
| G02F 1/01 | (2006.01) |
| H04R 1/02 | (2006.01) |

(Continued)

(52) U.S. Cl.
CPC ........... *H04R 1/323* (2013.01); *G02F 1/0102* (2013.01); *H04R 1/026* (2013.01); *H04R 1/345* (2013.01); *H04R 1/403* (2013.01); *H04R 5/02* (2013.01); *H04N 5/642* (2013.01); *H04R 2499/15* (2013.01)

(58) Field of Classification Search
CPC ........ H04R 1/323; H04R 1/026; H04R 1/403; H04R 5/02; H04R 1/345; H04R 1/2819; H04R 2499/15; G02F 1/0102; G10K 11/26; H04N 5/642
See application file for complete search history.

(56) References Cited

U.S. PATENT DOCUMENTS

| | | | |
|---|---|---|---|
| 2,789,651 A * | 4/1957 | Daniels | ................. H04R 1/342 181/198 |
| 5,111,509 A | 5/1992 | Takeuchi et al. | |
| 5,552,569 A | 9/1996 | Sapkowski | |

(Continued)

FOREIGN PATENT DOCUMENTS

| | | |
|---|---|---|
| EP | 0 725 540 A2 | 8/1996 |
| EP | 0 725 540 A3 | 12/1998 |

(Continued)

OTHER PUBLICATIONS

K.R. Holland et al., "A Low-Cost End-Fire Acoustic Radiator", J. Audio Eng. Soc., vol. 39, No. 7/8, Jul./Aug. 1991 (pp. 540-550).

(Continued)

*Primary Examiner* — Andrew L Sniezek
(74) *Attorney, Agent, or Firm* — Sughrue Mion, PLLC

(57) ABSTRACT

A directional speaker and a display apparatus having the same are provided. In particular, the display apparatus includes a pair of directional speakers as a surround sound speaker, wherein each directional speaker includes a driver to generate sound and a guide tube provided with sound radiated holes linearly aligned on one surface thereof.

18 Claims, 15 Drawing Sheets

(51) Int. Cl.
*H04R 1/40* (2006.01)
*H04N 5/64* (2006.01)

(56) References Cited

U.S. PATENT DOCUMENTS

| | | | |
|---|---|---|---|
| 2007/0223744 A1* | 9/2007 | Wada | H04R 23/008 |
| | | | 381/152 |
| 2009/0274329 A1 | 11/2009 | Ickler et al. | |
| 2010/0260369 A1 | 10/2010 | Suzuki | |
| 2011/0026744 A1 | 2/2011 | Jankovsky et al. | |
| 2011/0305359 A1 | 12/2011 | Ikeda et al. | |
| 2012/0183162 A1 | 7/2012 | Chabanne et al. | |
| 2012/0237070 A1 | 9/2012 | Ickler et al. | |
| 2012/0263333 A1 | 10/2012 | Akino | |
| 2013/0265226 A1 | 10/2013 | Park et al. | |
| 2015/0341738 A1 | 11/2015 | Lyons et al. | |
| 2015/0382103 A1* | 12/2015 | Powell | H04R 1/2853 |
| | | | 381/338 |
| 2016/0170707 A1* | 6/2016 | Petainen | H04R 3/12 |
| | | | 715/716 |
| 2016/0219364 A1 | 7/2016 | Seefeldt et al. | |

FOREIGN PATENT DOCUMENTS

| | | | |
|---|---|---|---|
| JP | 5-73068 A | 3/1993 | |
| JP | 05073068 | * 3/1993 | ............ G10K 15/00 |
| WO | 2009/134591 A1 | 11/2009 | |

OTHER PUBLICATIONS

Communication dated Feb. 21, 2018 issued by the European Patent Office in counterpart European Patent Application No. 17204749.0.
International Search Report (PCT/ISA/210) dated Mar. 20, 2018 issued by the International Searching Authority in counterpart International Application No. PCT/KR2017/013904.

* cited by examiner

DIRECTIONAL SPEAKER AND DISPLAY APPARATUS HAVING THE SAME

CROSS-REFERENCE TO RELATED APPLICATION

This application claims priority from Korean Patent Application No. 10-2016-0167539, filed on Dec. 9, 2016 in the Korean Intellectual Property Office, the disclosure of which is incorporated herein by reference in its entirety.

BACKGROUND

1. Field

Apparatuses and methods consistent with one or more exemplary embodiments relate to a directional speaker and a display apparatus including the directional speaker as a surround sound speaker.

2. Description of the Related Art

A display apparatus is an apparatus that displays a screen by receiving image signals. Examples of a display apparatus include a television, a monitor, and the like.

A display apparatus includes a display unit configured to display a screen and a stand configured to support the display unit. Speakers that output sounds are arranged in the display unit.

Speakers include front speakers disposed at lower portions of the display unit and allowing viewers in front of the display apparatus to receive audio from the front and surround sound speakers disposed at rear portions of the display unit opposite to each other and allowing the viewers to receive audio from both sides of the front.

In recent years, a thickness of a display unit has been reduced for better design. However, there is a limit to the reduction of thickness since the display units accommodate the speakers or printed circuit boards (PCBs) to control the operation of display apparatuses.

Thus, related art display apparatuses having a display unit that appears slim have been developed by increasing a thickness of a central portion of the display unit to accommodate speakers and PCBs while decreasing thicknesses of both side edges.

SUMMARY

Aspects of one or more exemplary embodiments provide a directional speaker efficiently radiating sounds generated by a driver unit out of a guide tube.

Aspects of one or more exemplary embodiments also provide a display apparatus having surround sound effects even when surround sound speakers are disposed at central regions of a display unit.

Additional aspects will be set forth in part in the description which follows and, in part, will be obvious from the description, or may be learned by practice of the disclosure.

According to an aspect of an exemplary embodiment, there is provided a directional speaker including: a driver configured to generate a sound; a guide tube having a hollow tube shape with a first end and a second end that is open, the guide tube configured to guide the sound generated by the driver and received via the first end; and a cap configured to cover the second end of the guide tube, wherein the guide tube includes a plurality of sound radiation holes on a first surface thereof, wherein an inside of the guide tube has cross-sectional areas that decrease from the first end of the guide tube to the second end of the guide tube, and wherein the cap has a groove in a V-shape on an inner surface facing the second end of the guide tube to allow sounds that reach the groove to destructively interfere with each other.

The plurality of sound radiation holes may have sizes changing from the first end of the guide tube on a driver side to the second end of the guide tube opposite to the first end.

The plurality of sound radiation holes may have a same size.

Intervals between the plurality of sound radiation holes may decrease from the first end of the guide tube on a driver side to the second end of the guide tube opposite to the first end.

The plurality of sound radiation holes may be aligned on the first surface at regular intervals.

The directional speaker may further include a throat tube having a hollow tube shape and disposed between the driver and the guide tube, wherein the throat tube may have a throat portion adjacent to the driver and having a smaller width than an adjacent portion of the throat tube.

The directional speaker may further include a sound absorbing material on the inner surface of the cap facing the second end of the guide tube.

According to an aspect of another exemplary embodiment, there is provided a display apparatus including: a display configured to display a screen; and a pair of directional speakers symmetrically disposed at opposite sides of the display, wherein each of the pair of directional speakers includes: a driver configured to generate a sound, and a guide tube having a hollow tube shape and configured to guide the sound generated by the driver to be radiated to an outside, and wherein the guide tube includes a plurality of sound radiation holes linearly aligned on a first surface thereof.

The guide tube may extend horizontally on the display, and the plurality of sound radiation holes may be on an upper surface of the guide tube.

An inside of the guide tube may have cross-sectional areas that decrease from a first end of the guide tube on a driver side to a second end of the guide tube opposite to the first end.

The first surface of the guide tube may be at an acute angle relative to a lengthwise direction of the guide tube.

The plurality of sound radiation holes may have sizes changing from a first end of the guide tube on a driver side to a second end of the guide tube opposite to the first end.

The plurality of sound radiation holes may have a same size.

Intervals between the plurality of sound radiation holes may change from a first end of the guide tube on a driver side to a second end of the guide tube opposite to the first end.

The plurality of sound radiation holes may be arranged on the first surface at regular intervals.

The display apparatus may further include a throat tube having a hollow tube shape and disposed between the driver and the guide tube, wherein the throat tube may have a throat portion adjacent to the driver and having a smaller width than an adjacent portion of the throat tube.

The display apparatus may further include a cap configured to cover a second end of the guide tube, the second end being opposite to a first end on a driver side of the guide tube.

The cap may have a groove in a V-shape on an inner surface facing the second end of the guide tube to allow sounds that reach the groove to destructively interfere with each other.

The display apparatus may further include a sound absorbing material on an inner surface of the cap facing the second end of the guide tube.

According to an aspect of another exemplary embodiment, there is provided a display apparatus including: a display configured to display a screen; a pair of first directional speakers disposed at upper portions of the display opposite to each other; and a pair of second directional speakers disposed at side portions of the display opposite to each other, wherein each of the pair of first directional speakers and each of the pair of second directional speakers includes: a driver configured to generate a sound, and a guide tube having a hollow tube shape and configured to guide the sound generated by the driver to be radiated to an outside, wherein the guide tubes respectively included in the pair of first directional speakers include a plurality of sound radiation holes linearly aligned on an upper surface thereof, wherein the guide tubes respectively included in the pair of second directional speakers include a plurality of sound radiation holes linearly aligned on a side surface thereof, and wherein the guide tubes respectively included in the pair of first directional speakers are aligned in a direction perpendicular to an alignment direction of the guide tubes respectively included in the pair of second directional speakers.

An inside of the guide tube may have cross-sectional areas that decrease from a first end of the guide tube on a driver side to a second end of the guide tube opposite to the first end.

The plurality of sound radiation holes may have sizes changing from a first end of the guide tube on a driver side to a second end of the guide tube opposite to the first end.

The plurality of sound radiation holes may have a same size.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

Figure 1:
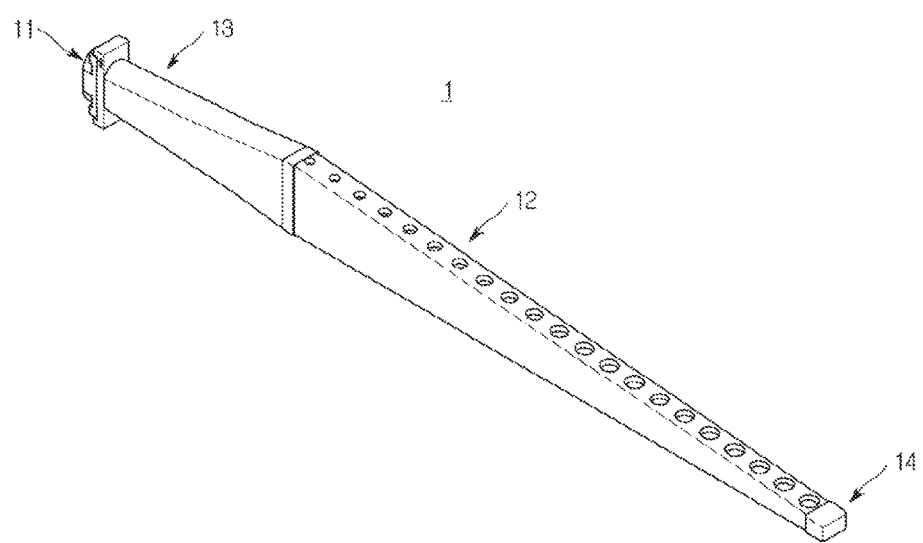
FIG. 1 is a perspective view illustrating a directional speaker according to a first exemplary embodiment.

Reference will now be made in detail to exemplary embodiments, examples of which are illustrated in the accompanying drawings, wherein like reference numerals refer to like elements throughout. The present disclosure may, however, be embodied in many different forms and should not be construed as being limited to exemplary embodiments set forth herein; rather, these exemplary embodiments are provided so that this disclosure will be thorough and complete, and will fully convey the concept of the disclosure to those of ordinary skill in the art.

The terms used in the present specification are merely used to describe particular exemplary embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first," "second," etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items. Similarly, expressions such as "at least one of," when preceding a list of elements, modify the entire list of elements and do not modify the individual elements of the list.

In addition, the terms used throughout the specification "front end," "rear end," "upper," "lower," "upper end," lower end", and the like are defined based on the drawings and the shape and position of each element are not limited by these terms.

Hereinafter, a directional speaker 1 according to a first exemplary embodiment will be described in detail with reference to the accompanying drawings.

Figure 2:
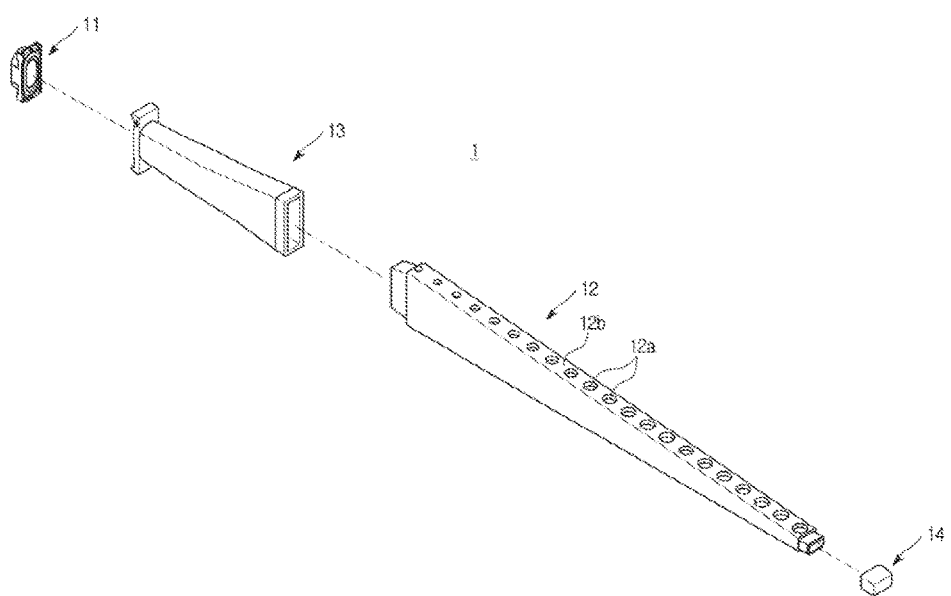
FIG. 2 is an exploded perspective view illustrating the directional speaker according to the first exemplary embodiment.
Figure 3:
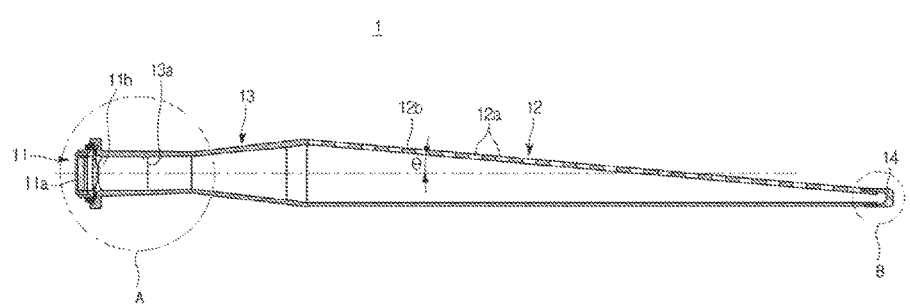
FIG. 3 is a sectional view illustrating the directional speaker according to the first exemplary embodiment.

As illustrated in FIGS. 1 to 3, a directional speaker 1 according to an exemplary embodiment includes a driver unit 11 (e.g., driver) configured to generate a sound, and a guide tube 12 formed in a hollow tube shape, connected to a throat tube 13, and configured to guide the sound received from the driver unit 11 to be radiated to the outside. The throat tube 13 is disposed between the driver unit 11 and the guide tube 12 and has one end provided with or connected to the driver unit 11 and the other end connected to one end of the guide tube 12. The directional speaker 1 also has a cap 14 covering the other end of the guide tube 12 that is otherwise open.

Figure 4:
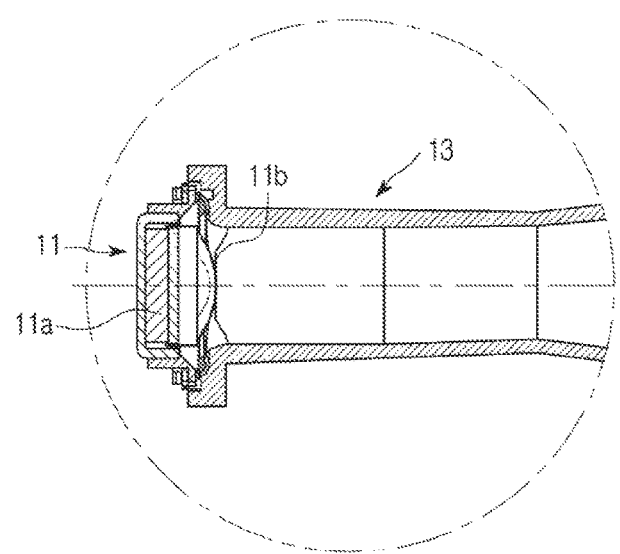
FIG. 4 is an enlarged view illustrating a portion A of FIG. 3.

The driver unit 11 includes an electromagnet 11a configured to generate a magnetic force upon receiving an electrical signal and a diaphragm 11b configured to generate a sound while oscillating by the electromagnet 11a as illustrated in FIG. 4.

The throat tube 13 is formed or provided in a hollow tube shape such that the inside of the throat tube 13 has a width that gradually increases (e.g., toward the guide tube 12). Thus, the throat tube 13 may guide the sound generated by the driver unit 11 toward the guide tube 12 while simultaneously reducing noise that may be caused as a result of a rapid pressure change.

As illustrated in FIG. 2, the guide tube 12 has a plurality of sound radiation holes 12a linearly aligned on a side surface of the guide tube 12 in a lengthwise direction of the guide tube 12 to radiate sounds to the outside. According to an exemplary embodiment, the sound radiation holes 12a are spaced apart from each other at regular intervals.

The sound radiation holes 12a formed in or having a circular hole shape have sizes increasing from one end of the guide tube 12 disposed on the driver unit 11 side to the other end of the guide tube 12 disposed on the opposite side. This structure allows a larger amount of sounds to be radiated through the sound radiation holes 12a disposed closer to the other end of the guide tube 12, thereby improving directivity of sounds generated in a direction corresponding to the lengthwise direction of the guide tube 12.

The guide tube 12 formed in a hollow tube shape has a substantially rectangular cross-section. Additionally, a surface having the sound radiation holes 12a constitutes a sound radiation surface 12b through which sounds are radiated.

When the sound radiation holes 12a are linearly aligned on the sound radiation surface 12b of the guide tube 12 as described above, sounds received through the throat tube 13 are radiated out of the guide tube 12 through each of the sound radiation holes 12a while passing through the guide tube 12.

Since a sound is an acoustic wave propagating by a pressure change through air as a transmission medium, sounds radiated with time differences through the sound radiation holes 12a, which are linearly aligned on the guide tube 12, may destructively and constructively interfere with each other. While the sounds interfere with each other, the sounds have directivity in a direction corresponding to the lengthwise direction of the guide tube 12. That is, the directional speakers 1 according to the present exemplary embodiment operate as directional speakers due to the structure of the guide tube 12 having the sound radiation holes 12a.

The inside of the guide tube 12 formed in a hollow tube according to the present exemplary embodiment has cross-sectional areas gradually decreasing from one end disposed on the driver unit 11 side to the other end on the opposite side (i.e., an end at which the cap 14 is located).

Sounds arriving at the guide tube 12 are sequentially radiated through the sound radiation holes 12a while passing through the guide tube 12. Thus, although sound pressure gradually decreases while passing through the guide tube 12, a sound having a sound pressure at a similar level to those of sounds radiated through the other sound radiation holes 12a may be radiated from a sound radiation hole 12a located closer to the other end of the guide tube 12 by the structure in which the inner cross-sectional areas of the guide tube 12 gradually decrease as described above.

In addition, if the inner cross-sectional areas of the guide tube 12 gradually decrease from the one end of the guide tube 12 to the other end thereof as described above, most of the sounds passing through the guide tube 12 are radiated to the outside through the sound radiation holes 12a, so that sounds generated by the driver unit 11 are more efficiently radiated to the outside. In addition, as more sounds are radiated through the sound radiation holes 12a, less sounds arrive at the cap 14 located at the other end of the guide tube 12. That is, by gradually reducing the inner cross-sectional areas of the guide tube 12, noise caused when the sounds arriving at the cap 14 are reflected thereby toward the driver unit 11 may be reduced.

In the present exemplary embodiment, the sound radiation surface 12b extends at an acute angle relative to the lengthwise direction of the guide tube 12 as shown in the drawings. Since the sound radiation holes 12a are formed on the sound radiation surface 12b as described above, the sounds are guided and radiated by the sound radiation surface 12b. Thus, directivity of the directional speaker 1 is improved with an increase of an angle (θ) between the lengthwise direction of the guide tube 12 and the sound radiation surface 12b.

Figure 5:
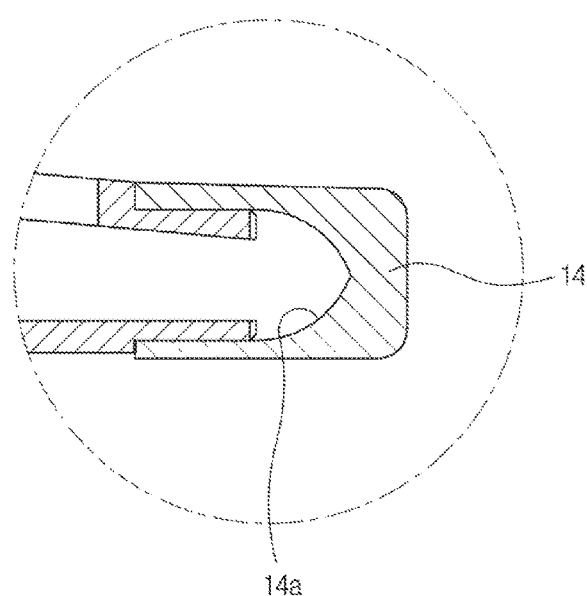
FIG. 5 is an enlarged view illustrating a portion B of FIG. 3.

The cap 14 is installed or provided at the other end of the guide tube 12 that is otherwise open to close the other end of the guide tube 12 as illustrated in FIG. 5. In addition, the inner surface of the cap 14 facing the other end of the guide tube 12 is formed or provided to have vertical lengths gradually decreasing and forms or has a groove 14a with a substantial V-shape. Thus, sounds arriving at the cap 14 destructively interfere with each other while being reflected by the inner surface of the cap 14. Thus, the noise caused when the sounds arriving at the other end of the guide tube 12 are reflected toward the driver unit 11 is further reduced. Furthermore, a sound absorbing material such as a sponge may also be disposed on the inner surface of the cap 14 facing the other end of the guide tube 12.

Figure 6:
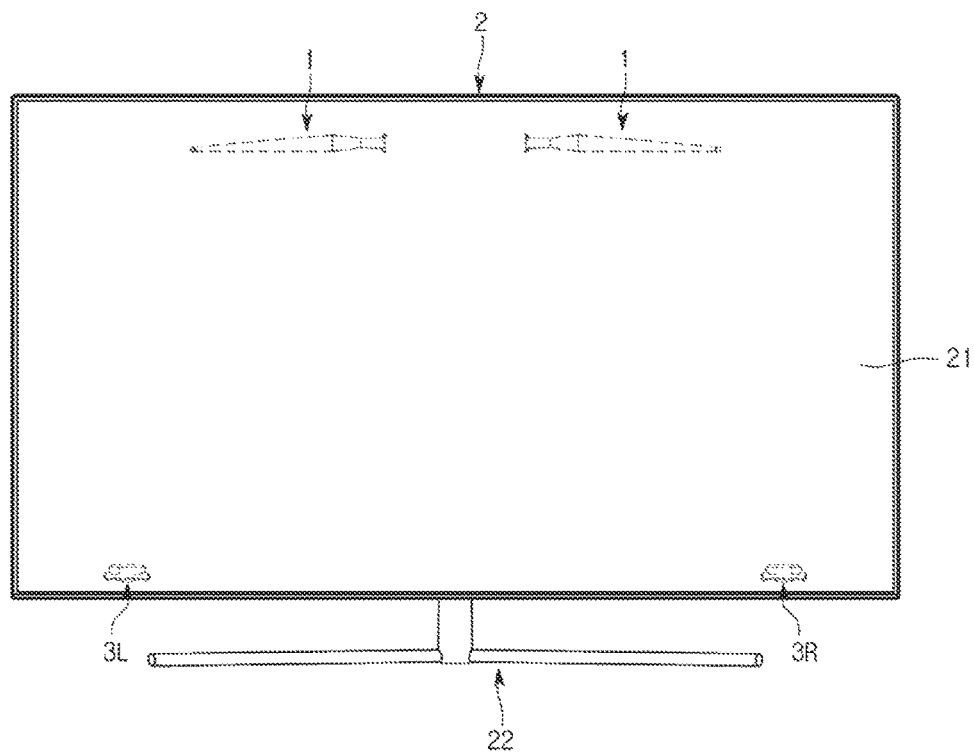
FIG. 6 is a front view illustrating a display apparatus including the directional speaker according to the first exemplary embodiment.

The aforementioned directional speaker 1 may be used as a surround sound speaker in the display apparatus 2, as illustrated in FIG. 6.

Referring to FIG. 6, the display apparatus 2 includes a display unit 21 having a screen on the front surface thereof and a stand 22 that supports the display unit 21. The directional speakers 1 according to the present exemplary embodiment are built in the upper rear portions of the display unit 21 and used as surround sound speakers.

The display apparatus 2 further includes a pair of front speakers 3L and 3R disposed at lower portions of the display unit 21 opposite to each other and woofers that reproduce sounds having low frequencies.

The front speakers 3L and 3R are speakers allowing viewers in front of the display unit 21 to listen to sounds from the front. According to the present exemplary embodiment, the front speakers 3L and 3R output sounds downward.

A pair of directional speakers 1 are symmetrically disposed at upper portions of the display unit 21 opposite to each other and output obliquely toward both upper sides of the display unit 21. In this case, since the screen is displayed on the front surface of the display unit 21, the directional speakers 1 are disposed at rear portions of the display unit 21 opposite to each other and invisible to viewers.

According to the present exemplary embodiment, the driver units 11 respectively disposed in the two directional speakers 1 are aligned to face both sides and generate sounds towards the both sides. Additionally, the throat tubes 13 and the guide tubes 12 respectively disposed in the two directional speakers 1 are aligned in a lateral direction of the display unit 21 to guide the sounds generated by the driver units 11 toward the both sides of the display unit 21.

According to the present exemplary embodiment, the guide tubes 12 included in the directional speakers 1 extend in the lateral direction such that the sound radiation surfaces 12*b* of the guide tubes 12 face up. Thus, sounds radiated through the sound radiation holes 12*a* of the guide tubes 12 proceed upward from the sound radiation holes 12*a*. The radiated sounds have directivity in a direction corresponding to the lengthwise direction of the guide tube 12 while constructively and destructively interfering with each other as described above. Thus, sounds output from the directional speakers 1 propagate obliquely toward both upper sides from the center of the display unit 21.

Since sounds generated by the directional speakers 1 propagate with directivity obliquely toward both upper sides from the center of the display unit 21 as described above, surround sound effects may be maintained even when the directional speakers 1 are disposed at central regions of the display unit 21.

Thus, sounds output from the front speakers 3L and 3R are transmitted to the viewers after being reflected by shelves mounted with the display apparatus 2 or the floor of an indoor room and sounds output from the directional speakers 1 are transmitted to the viewers after being reflected by the ceiling and walls on the both sides of the display unit 21. As a result, the viewers may feel or perceive surround sound effects by receiving the sounds output from the front speakers 3L and 3R from the front or from the lower front and the sounds output from the directional speakers 1 from the both sides.

Although the sound radiation holes 12*a* are formed or provided on the upper surface of the guide tube 12 and sounds are output toward the both upper sides from the center of the display unit 21 in the directional speakers 1 according to the present exemplary embodiment, it is understood that one or more other exemplary embodiments are not limited thereto. For example, according to one or more other exemplary embodiments, the directional speakers may also be aligned such that the sound radiation holes of the guide tube face down, or to the sides or the central region of the display apparatus 2.

When the sound radiation holes of the directional speakers are aligned to face down, sounds generated by the directional speakers are transmitted to the viewers after being reflected by walls on the both sides of the display unit. Thus, the surround sound effects may be provided by the directional speakers.

In order to obtain stereo effects by using the directional speakers as described above, installation positions of the directional speakers are not limited to the upper portions of the display unit. For example, according to one or more other exemplary embodiments, the directional speakers may also be disposed at upper and lower portions of the display unit or at central portions of the display unit.

Figure 7:
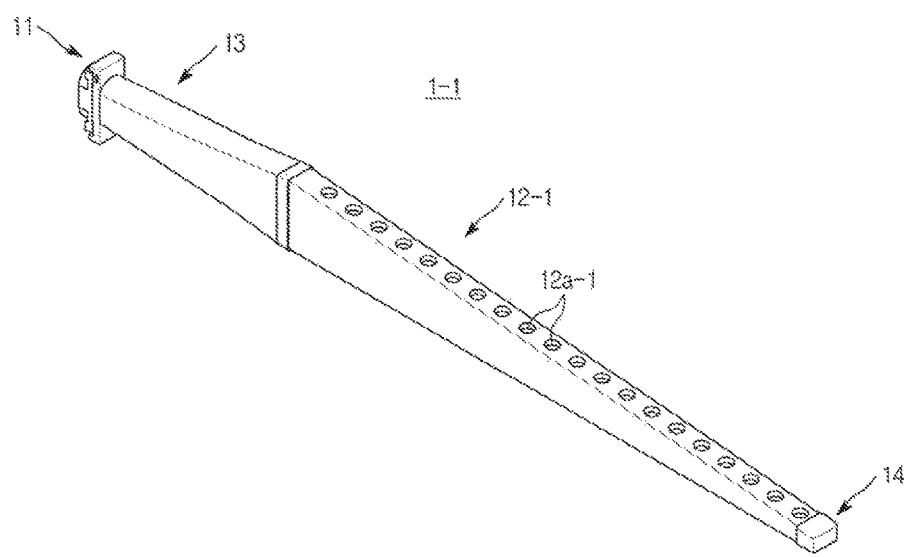
FIG. 7 is a perspective view illustrating a directional speaker according to a second exemplary embodiment.

According to the present exemplary embodiment, the sound radiation holes 12*a* of the guide tube 12 have sizes increasing from one end of the guide tube 12 to the other end. This structure is used to improve directivity of sounds generated by the directional speaker 1. However, it is understood that one or more other exemplary embodiments are not limited thereto. For example, according to a second exemplary embodiment as illustrated in FIG. 7, sound radiation holes 12*a*-1 of a guide tube 12-1 may have the same size. In this case, directivity of sounds generated by a directional speaker 1-1 may be relatively low in comparison with that of the directional speaker 1.

Figure 8:
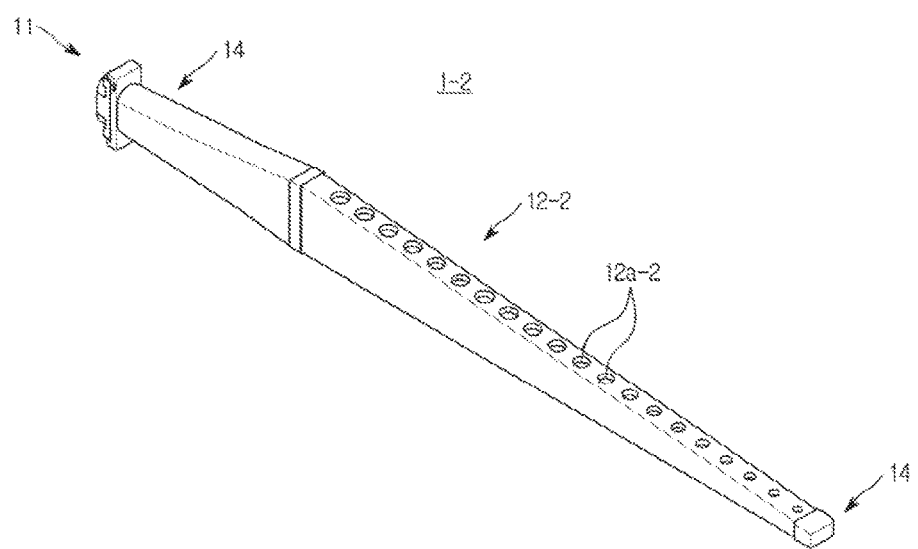
FIG. 8 is a perspective view illustrating a directional speaker according to a third exemplary embodiment.

Furthermore, according to a third exemplary embodiment as illustrated in FIG. 8, sound radiation holes 12*a*-2 may have sizes decreasing from the one end of the guide tube 12-2 to the other end. When the sizes of the sound radiation holes 12*a*-2 decrease as described above, directivity of sounds generated by a directional speaker 1-2 may further be reduced.

Therefore, the degree of directivity of sounds generated by the directional speaker may be selectively adjusted by design by changing the sizes of the sound radiation holes as described above.

Figure 9:
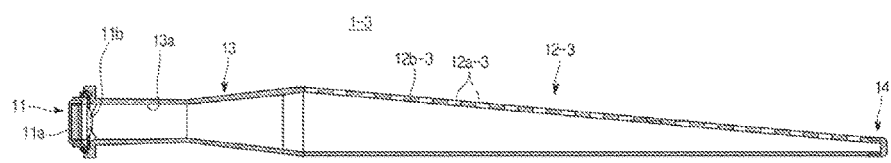
FIG. 9 is a sectional view illustrating a directional speaker according to a fourth exemplary embodiment.

Furthermore, according to a fourth exemplary embodiment as illustrated in FIG. 9, sound radiation holes 12*a*-3 having the same size may be aligned at regular intervals.

Figure 10:
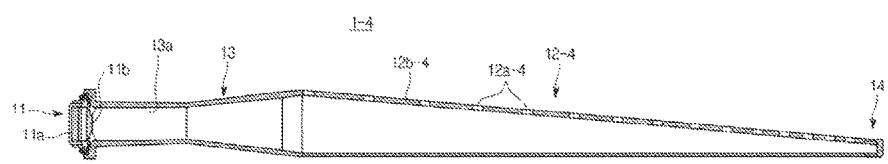
FIG. 10 is a sectional view illustrating a directional speaker according to a fifth exemplary embodiment.

Also, according to a fifth exemplary embodiment as illustrated in FIG. 10, sound radiation holes 12*a*-4 having the same size may be aligned on a guide tube 12-4 such that intervals between the sound radiation holes 12*a*-4 decrease from the one end of the guide tube 12-4 disposed at the driver unit 11 side to the other end.

When the intervals between the sound radiation hole 12*a*-4 decrease as described above, more sound radiation holes 12*a*-4 are disposed at portions closer to the other end of the guide tube 12-4 (i.e., an end where the cap 14 is located) than those close to the one end of the guide tube 12-4 (i.e., an end where the throat tube 13 is located). Additionally, more sounds are radiated through the sound radiation holes 12*a*-4 closer to the other end of the guide tube 12-4. Thus, the sounds radiated in a direction corresponding to the lengthwise direction of the guide tube 12-4 may have improved directivity.

Figure 11:
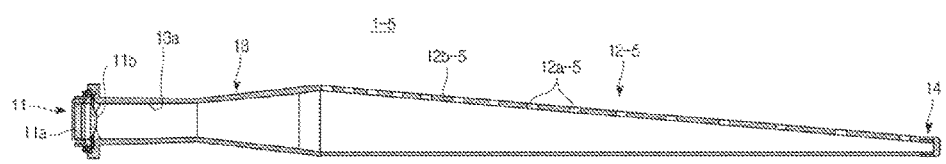
FIG. 11 is a sectional view illustrating a directional speaker according to a sixth exemplary embodiment.

In addition, according to a sixth exemplary embodiment as illustrated in FIG. 11, sound radiation holes 12*a*-5 having the same size may be aligned on a guide tube 12-5 at intervals increasing from the one end of the guide tube 12-5 disposed at a driver unit 11-5 side to the other end to decrease directivity of a directional speaker 1-5.

Therefore, the degree of directivity of sounds generated by the directional speaker 1 may be selectively adjusted by design by changing the intervals between the sound radiation holes as described above.

Figure 12:
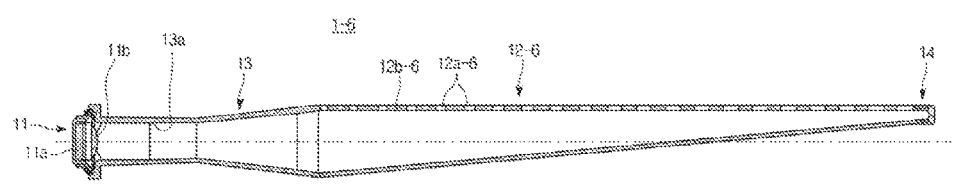
FIG. 12 is a sectional view illustrating a directional speaker according to a seventh exemplary embodiment.

Also, although the sound radiation surface 12*b* is at an acute angle relative to the lengthwise direction of the directional speaker 1 to increase directivity of the directional speaker 1 according to the present exemplary embodiment, it is understood that one or more other exemplary embodiments are not limited thereto. For example, according to a seventh exemplary embodiment as illustrated in FIG. 12, a sound radiation surface 12*b*-6 of a guide tube 12-6 may be disposed parallel to the lengthwise direction of the directional speaker 1 to decrease directivity of a directional speaker 1-6.

Figure 13:
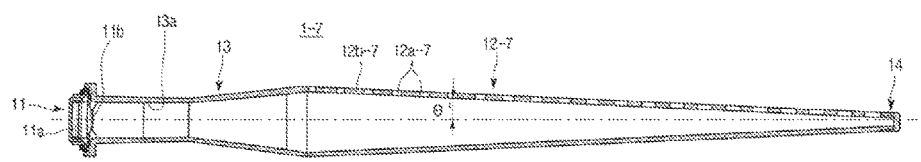
FIG. 13 is a sectional view illustrating a directional speaker according to an eighth exemplary embodiment.

Also, according to an eighth exemplary embodiment as illustrated in FIG. 13, the sound radiation surface 12*b*-7 of a guide tube 12-7 may be at a smaller angle (θ') relative to the lengthwise direction of the guide tube 12 to decrease the degree of directivity of a directional speaker 1-7.

Therefore, the degree of directivity of sounds generated by the directional speaker 1 may be selectively adjusted by design by adjusting the angle (θ) between the lengthwise direction of the guide tube 12 and the sound radiation surface 12*b* as described above.

Figure 14:
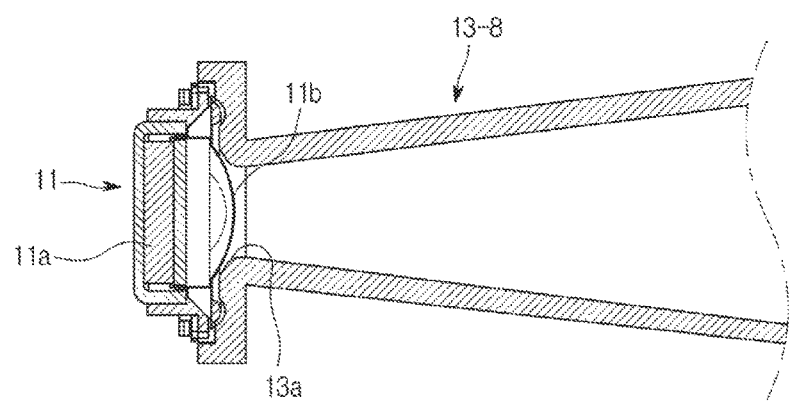
FIG. 14 is a cross-sectional view illustrating a driver unit and throat tube according to a ninth exemplary embodiment.

Although the inside of the throat tube 13 has widths gradually increasing according to the first exemplary embodiment, it is understood that one or more other exemplary embodiments are not limited thereto. For example, according to a ninth exemplary embodiment as illustrated in FIG. 14, a throat tube 13-8 may have a throat portion 13a formed or provided close to the driver unit 11 and having a relatively small width as compared to adjacent portions thereof inside the throat tube 13-8

As described above in detail, the directional speaker 1 applied to the display apparatus 2 according to various exemplary embodiments may have various degrees of directivity of sounds propagating from the directional speaker 1 by controlling at least one of sizes of the sound radiation holes 12a of the guide tube 12, the intervals between the sound radiation holes 12a, and the angle (θ) with the sound radiation surface 12b.

Figure 15:
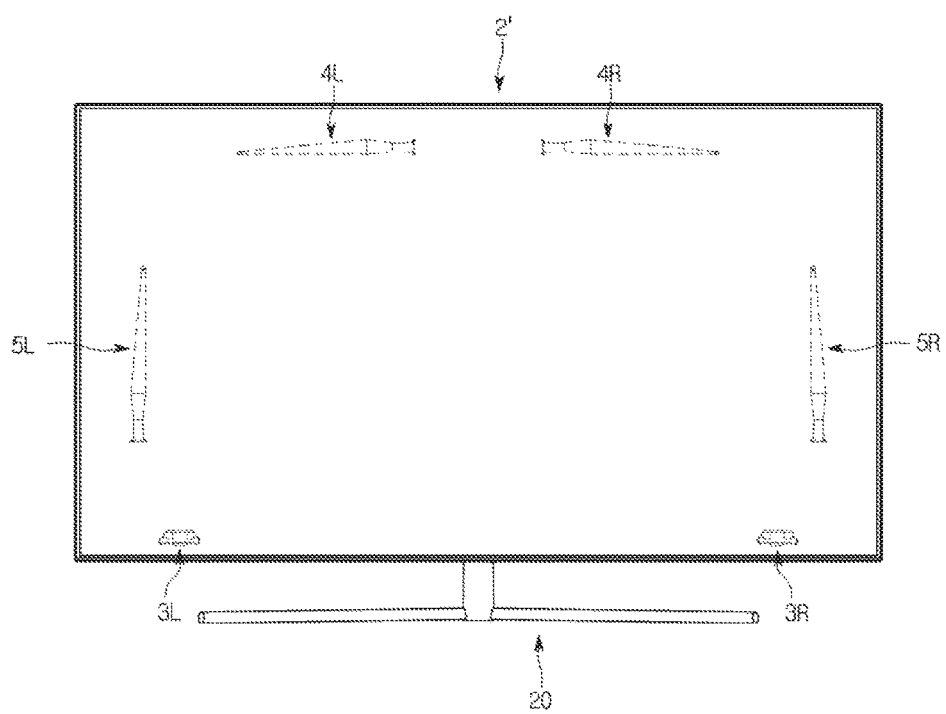
FIG. 15 is a front view illustrating a display apparatus including a directional speaker according to a tenth exemplary embodiment.

Although two directional speakers 1 are disposed to output sounds toward both upper sides from the center of the display unit 21 according to disclosed exemplary embodiments, it is understood that one or more other exemplary embodiments are not limited thereto. For example, according to a tenth exemplary embodiment as illustrated in FIG. 15, a display apparatus 2' may also include directional speakers 4L, 4R, 5L, and 5R used as surround sound speakers and two front speakers 3L and 3R.

In this case, two directional speakers (hereinafter, referred to as first directional speakers 4L and 4R) may be disposed at upper portions of the display unit 21 opposite to each other such that sound radiation holes of the first directional speakers 4L and 4R face up.

Additionally, two other directional speakers (hereinafter, referred to as second directional speakers 5L and 5R) may be disposed at side portions of the display unit 21 opposite to each other such that sound radiation holes of the second directional speakers 5L and 5R face to the sides.

When the directional speakers are aligned as described above, the first directional speakers 4L and 4R output sounds toward the both sides from the center of the display unit 21 and the second directional speakers 5L and 5R output sounds toward the upward from the center of the display unit 21.

Thus, the sounds output from the first directional speakers 4L and 4R are reflected by the walls on the both sides of the display unit 21 respectively and proceed in a forward direction from the display unit 21 and the sounds output from the second directional speakers 5L and 5R are reflected by the ceiling above the display unit 21 respectively and proceed in the forward direction from the display unit 21.

Therefore, viewers of the display unit 21 in front of the display unit 21 may feel or perceive stereo surround sound effects by receiving sounds output from the front speakers 3L and 3R from the front, sounds output from the first directional speakers 4L and 4R from the both sides, and sounds output from the second directional speakers 5L and 5R downward from the upper sides.

While the second directional speakers 5L and 5R may be disposed at side portions of the display unit 21 opposite to each other such that sound radiation holes of the second directional speakers 5L and 5R face to the sides, it is understood that one or more other exemplary embodiments are not limited thereto. For example, according to another exemplary embodiment, the second directional speakers 5L and 5R may be disposed at side portions of the display unit 21 opposite to each other such that sound radiation holes of the second directional speakers 5L and 5R face up, down, or towards a central region of the display apparatus 2'.

Although the sound radiation holes 12a are formed or provided in a circular shape in above-described exemplary embodiments, it is understood that one or more other exemplary embodiments are not limited thereto. For example, in one or more other exemplary embodiments, the sound radiation holes may also be formed or provided in an elliptical slit shape or various other shapes.

In addition, although the inside of the guide tube 12 is formed or provided to have a substantially rectangular cross-section in the above-described exemplary embodiments, the cross-section is not limited thereto in one or more other exemplary embodiments. For example, the inside of the guide tube may also be formed or provided in a symmetrical cross-section such as a circular, a rectangular, or an oval cross-section or an asymmetrical cross-section formed in combination thereof.

As is apparent from the above description, since the directional speaker according to one or more exemplary embodiments includes the guide tube having cross-sectional areas gradually decreasing from one end to the other end and the cap capable of attenuating sounds and disposed at the other end of the guide tube that is otherwise open, sounds may be radiated out of the guide tube more efficiently with less noise caused by reflection of the sounds.

Furthermore, since the display apparatus according to one or more exemplary embodiments uses the directional speakers as surround sound speakers, surround sound effects may be maintained by the directional speakers even when the surround sound speakers implemented using the directional speakers are disposed at central regions of the display apparatus.

It should be understood that exemplary embodiments described herein should be considered in a descriptive sense only and not for purposes of limitation. For example, a single element in the above description may be divided into a plurality of elements, and a plurality of elements in the above description may be combined into a single element. Descriptions of features or aspects within each exemplary embodiment should typically be considered as available for other similar features or aspects in other exemplary embodiments.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A directional speaker comprising:
   a driver configured to generate a sound;
   a guide tube having a first end at a side at which the driver is provided and a second end opposite to the first end, the guide tube being configured to guide the sound generated by the driver and received via the first end, wherein the guide tube comprises a plurality of sound radiation holes; and
   a throat tube disposed between the driver and the guide tube,
   wherein an inside of the guide tube has cross-sectional areas that decrease in a direction from the first end of the guide tube toward the second end of the guide tube,
   wherein the plurality of sound radiation holes have sizes changing in the direction from the first end of the guide tube toward the second end of the guide tube, and
   wherein an inside of the throat tube has cross-sectional areas that increase in a direction from the driver toward the first end of the guide tube.

2. The directional speaker according to claim 1, wherein intervals between the plurality of sound radiation holes decrease in the direction from the first end of the guide tube toward the second end of the guide tube.

3. The directional speaker according to claim 1, wherein the plurality of sound radiation holes are aligned at regular intervals.

4. The directional speaker according to claim 1, wherein the throat tube has a throat portion adjacent to the driver and having a smaller width than an adjacent portion of the throat tube.

5. The directional speaker according to claim 1, further comprising:
a cap configured to cover the second end of the guide tube,
wherein the cap has a groove in a V-shape on an inner surface facing the second end of the guide tube to allow sounds that reach the groove to destructively interfere with each other.

6. The directional speaker according to claim 5, further comprising a sound absorbing material on the inner surface of the cap facing the second end of the guide tube.

7. The directional speaker according to claim 1, wherein the plurality of sound radiation holes have sizes increasing in the direction from the first end of the guide tube toward the second end of the guide tube.

8. A display apparatus comprising:
a display; and
a speaker disposed behind the display, wherein the speaker comprises:
a driver configured to generate a sound,
a guide tube having a first end at a side at which the driver is provided and a second end opposite to the first end, the guide tube being configured to guide the sound generated by the driver and received via the first end,
a throat tube disposed between the driver and the guide tube, and
wherein the guide tube comprises a plurality of sound radiation holes that have sizes changing in a direction from the first end of the guide tube toward the second end of the guide tube, and
wherein an inside of the throat tube has cross-sectional areas that increase in a direction from the driver toward the first end of the guide tube.

9. The display apparatus according to claim 8, wherein:
the guide tube extends horizontally on the display; and
the plurality of sound radiation holes are on an upper surface of the guide tube.

10. The display apparatus according to claim 8, wherein an inside of the guide tube has cross-sectional areas that decrease in the direction from the first end of the guide tube toward the second end of the guide tube.

11. The display apparatus according to claim 10, wherein a first surface of the guide tube, on which the plurality of sound radiation holes is linearly aligned, is at an acute angle relative to a lengthwise direction of the guide tube.

12. The display apparatus according to claim 8, wherein intervals between the plurality of sound radiation holes change in the direction from the first end of the guide tube toward the second end of the guide tube.

13. The display apparatus according to claim 8, wherein the plurality of sound radiation holes are arranged on a first surface of the guide tube at regular intervals.

14. The display apparatus according to claim 8, wherein the throat tube has a throat portion adjacent to the driver and having a smaller width than an adjacent portion of the throat tube.

15. The display apparatus according to claim 8, wherein the speaker further comprises a cap configured to cover the second end of the guide tube.

16. The display apparatus according to claim 15, wherein the cap has a groove in a V-shape on an inner surface facing the second end of the guide tube to allow sounds that reach the groove to destructively interfere with each other.

17. The display apparatus according to claim 15, wherein the speaker further comprises a sound absorbing material on an inner surface of the cap facing the second end of the guide tube.

18. A display apparatus comprising:
a display;
a pair of first speakers disposed at upper portions of the display opposite to each other; and
a pair of second speakers disposed at side portions of the display opposite to each other,
wherein each of the pair of first speakers and each of the pair of second speakers comprises:
a driver configured to generate a sound,
a guide tube having a first end at a side at which the driver is provided and a second end opposite to the first end, the guide tube being configured to guide the sound generated by the driver and received via the first end, and
a throat tube disposed between the driver and the guide tube,
wherein the guide tubes respectively comprised in the pair of first speakers comprise a plurality of sound radiation holes linearly aligned on an upper surface thereof,
wherein the guide tubes respectively comprised in the pair of second speakers comprise a plurality of sound radiation holes linearly aligned on a side surface thereof,
wherein the guide tubes respectively comprised in the pair of first speakers are aligned in a direction perpendicular to an alignment direction of the guide tubes respectively comprised in the pair of second speakers,
wherein the plurality of sound radiation holes respectively comprised in each of the guide tubes have sizes changing in a direction from the first end of the guide tube toward the second end of the guide tube, and
wherein an inside of the throat tube has cross-sectional areas that increase in a direction from the driver toward the first end of the guide tube.

* * * * *